(12) United States Patent
Kutkut et al.

(10) Patent No.: US 10,848,010 B2
(45) Date of Patent: Nov. 24, 2020

(54) BATTERY MANAGEMENT SYSTEM AND RELATED METHODS

(71) Applicant: Advanced Charging Technologies Inc., La Miranda, CA (US)

(72) Inventors: Nasser Kutkut, Orlando, FL (US); Thikrallah Shreah, Oviedo, FL (US)

(73) Assignee: Advanced Charging Technologies Inc., Fountain Valley, CA (US)

( * ) Notice: Subject to any disclaimer, the term of this patent is extended or adjusted under 35 U.S.C. 154(b) by 366 days.

(21) Appl. No.: 15/939,862

(22) Filed: Mar. 29, 2018

(65) Prior Publication Data

US 2018/0287430 A1   Oct. 4, 2018

Related U.S. Application Data

(60) Provisional application No. 62/478,905, filed on Mar. 30, 2017.

(51) Int. Cl.
| | |
|---|---|
| *H02J 7/00* | (2006.01) |
| *H02J 50/40* | (2016.01) |
| *H02J 50/80* | (2016.01) |
| *H02J 7/02* | (2016.01) |
| *H02J 13/00* | (2006.01) |
| *H02J 50/10* | (2016.01) |

(52) U.S. Cl.
CPC ............ *H02J 50/40* (2016.02); *H02J 7/0022* (2013.01); *H02J 7/0027* (2013.01); *H02J 7/025* (2013.01); *H02J 13/0003* (2013.01); *H02J 50/10* (2016.02); *H02J 50/80* (2016.02)

(58) Field of Classification Search
USPC .................................. 320/106, 108
See application file for complete search history.

(56) References Cited

U.S. PATENT DOCUMENTS 9,346,365 B1 *   5/2016   Penilla ................. H02J 7/0027
2011/0258251 A1 *  10/2011   Antoci ................. G06Q 30/02
                                                          709/203

(Continued)

OTHER PUBLICATIONS

U.S. Appl. No. 12/942,733, filed Apr. 8, 2015.

(Continued)

*Primary Examiner* — Samuel Berhanu
(74) *Attorney, Agent, or Firm* — Allen, Dyer, Doppelt + Gilchrist, P.A.

(57) ABSTRACT

A battery management system for batteries at a geographical location may include wireless battery chargers at the geographical location for charging the batteries and wireless battery monitors at the geographical location associated with the batteries. The battery management system may also include a battery management cloud server for communicating with the wireless battery chargers and the wireless battery monitors to remotely determine a configuration of, and remotely collect charging data from, the wireless battery chargers, and remotely determine a configuration of, and remotely collect diagnostic measurement data for, the batteries based upon the wireless battery monitors. The battery management cloud server may also remotely process the collected charging data and diagnostic measurement data based upon the determined configurations of the batteries and the battery chargers.

20 Claims, 6 Drawing Sheets

(56) References Cited

U.S. PATENT DOCUMENTS

| | | | | |
|---|---|---|---|---|
| 2012/0277927 A1* | 11/2012 | Watkins | ............... | B60L 53/65 |
| | | | | 700/292 |
| 2014/0229129 A1* | 8/2014 | Campbell | ............... | H04Q 9/00 |
| | | | | 702/63 |
| 2015/0286965 A1* | 10/2015 | Amano | ............... | G06Q 10/02 |
| | | | | 705/5 |
| 2016/0105043 A1* | 4/2016 | Albsmeier | ............ | H01M 10/44 |
| | | | | 320/106 |
| 2016/0276842 A1* | 9/2016 | Shizuno | ............... | H01M 10/44 |
| 2018/0188786 A1* | 7/2018 | Chu | ............... | G06F 21/45 |

OTHER PUBLICATIONS

U.S. Appl. No. 15/067,283, filed Mar. 11, 2016.
U.S. Appl. No, 15/922,127, filed Mar. 15, 2018.
U.S. Appl. No. 15/944,010, filed Apr. 3, 2018.
U.S. Appl. No. 15/952,358, filed Apr. 13, 2018.
U.S. Appl. No. 15/952,900, filed Apr. 13, 2018.

* cited by examiner

BATTERY MANAGEMENT SYSTEM AND RELATED METHODS

RELATED APPLICATION

This application claims the benefit of provisional application Ser. No. 62/478,905 filed Mar. 30, 2017, which is hereby incorporated herein in its entirety by reference.

TECHNICAL FIELD

The present invention relates generally to battery systems, and more specifically to a battery management system and related methods.

BACKGROUND

Batteries are utilized in many traction and motive power applications to power electrical equipment and vehicles. Typical motive power applications include electric forklift trucks, reach trucks, pallet jacks, and automated guided vehicles.

In order to ensure proper operation of these vehicles, the batteries need to be charged regularly and may need to be monitored. Battery charging is the process of replenishing the discharged electrical energy from the electrical power network. This task is accomplished by employing battery chargers that are equipped with microprocessor controls to optimize the battery charging process.

Most of today's battery chargers incorporate a power conversion stage for converting the incoming alternating current (AC) power from the electrical grid into a direct current (DC) power suitable for the battery. In addition, today's chargers incorporate sense circuitry along with microprocessor controls to control the output current and voltage of the charger throughout the charge process as well as save charge cycle records. Advanced chargers also incorporate wired or wireless interfaces, such as RS-232, USB, ZigBee, Bluetooth, or WiFi, which allows end users to set up the charger parameters. The onboard microprocessor typically runs a firmware program that controls the charger operation, stores data, and communicates with a computer or handheld device to receive new charger set points.

Battery monitoring may also be desirable to monitor the status of batteries to ensure proper battery health and performance. A typical battery monitoring unit typically incorporates a microprocessor, memory for data storage, sensing circuitry, and some wired or wireless interface to set up the unit and download stored parameters. The battery monitor measures and stores battery voltage, battery current, battery temperature, and battery amp-hours throughout the charge and discharge (use) cycles. In addition, various settings are typically stored in these battery monitoring units including battery size, nameplate rating, battery ID and serial number among other things. The battery monitor onboard microprocessor typically runs a firmware program that controls the charger operation, stores data, and communicates with a computer or handheld device to receive new charger set points and download stored data.

While today's battery chargers and battery monitors offer many capabilities to deliver proper charge cycles and store critical battery performance data, these systems operate in isolation most of the time, where no or little communication occurs between the charge and the monitoring device. In addition, data cannot generally be easily retrieved from the charge or the monitor and new charger, and battery monitor settings are typically uploaded manually by being on site and connecting to each charger and battery monitoring device separately. Charger firmware program updates are not trivial and are typically done offline, i.e., the charger is typically disconnected from the power grid and the user would have to access a certain port along with a dedicated programmer to load a new firmware program. As for the battery monitor, firmware updates are not possible since most of these units are potted to protect the units from the environment and as such is inaccessible for firmware updates.

Due to the limitations of many existing battery charging and battery monitoring systems, further improvements may be desirable for a remote charger and battery management system.

SUMMARY

A battery management system for a plurality of batteries at a geographical location may include a plurality of wireless battery chargers at the geographical location for charging the plurality of batteries and a plurality of wireless battery monitors at the geographical location associated with the plurality of batteries. The battery management system may also include a battery management cloud server for communicating with the wireless battery chargers and the wireless battery monitors. The battery management cloud server may remotely determine a configuration of, and remotely collect charging data from, the wireless battery chargers and remotely determine a configuration of, and remotely collect diagnostic measurement data for, the plurality of batteries based upon the wireless battery monitors. The battery management cloud server may also remotely process the collected charging data and diagnostic measurement data based upon the determined configurations of the batteries and the battery chargers.

The battery management cloud server may be further configured to remotely update a subset of the wireless battery chargers as a group with a uniform configuration. The battery management cloud server may further be configured to remotely update a subset of the wireless battery monitors as a group with a uniform configuration, for example.

The battery management cloud server may be further configured to remotely change the configurations of the wireless battery chargers and the wireless battery monitors. The battery management cloud server may also be configured to remotely cause the wireless battery monitors to initiate battery diagnostic measurements, for example.

The battery management cloud server may further be configured to stream the remotely collected charging data and diagnostic measurement data to a remote client, for example. The wireless battery monitors may be configured to initiate a measurement calibration cycle upon connection of the batteries to the wireless battery chargers for charging. The battery management cloud server may also be configured to remotely send a calibration command to the wireless battery monitors, and the wireless battery monitors may be configured to initiate the measurement calibration cycle responsive to the calibration command, for example. The battery management cloud server may also be configured to generate and send alerts to a remote client based upon processing of the remotely collected charging and diagnostic measurement data.

The battery management cloud server may be further configured to remotely send updated firmware to the plurality of wireless battery monitors. The plurality of wireless battery monitors may be configured to save the updated firmware and reboot based upon the updated firmware, for example.

The battery management cloud server may further be configured to remotely send an updated firmware to the plurality of wireless battery chargers. The plurality of wireless battery chargers may be configured to save the updated firmware and reboot based upon the updated firmware, for example.

A method aspect is directed to a battery management method. The method may include using a battery management cloud server for communicating with a plurality of wireless battery chargers at a geographical location for charging a plurality of batteries and a plurality of wireless battery monitors at the geographical location associated with the plurality of batteries to remotely determine a configuration of, and remotely collect charging data from, the wireless battery chargers. The method may further include using the battery management cloud server to remotely determine a configuration of, and remotely collect diagnostic measurement data for, the plurality of batteries based upon the wireless battery monitors, and remotely process the collected charging data and diagnostic measurement data based upon the determined configurations of the batteries and the battery chargers.

A computer readable medium aspect is directed to a non-transitory computer readable medium for a battery management cloud server of a battery management system for a plurality of batteries at a geographical location and that includes a plurality of wireless battery chargers at a geographical location for charging the plurality of batteries and a plurality of wireless battery monitors at the geographical location associated with the plurality of batteries. The non-transitory computer readable medium includes computer executable instructions that when executed by a processor of the battery management cloud server cause the processor to perform operations that may include remotely determining a configuration of, and remotely collect charging data from, the wireless battery chargers and remotely determining a configuration of, and remotely collect diagnostic measurement data for, the plurality of batteries based upon the wireless battery monitors. The operations may also include remotely processing the collected charging data and diagnostic measurement data based upon the determined configurations of the batteries and the battery chargers.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
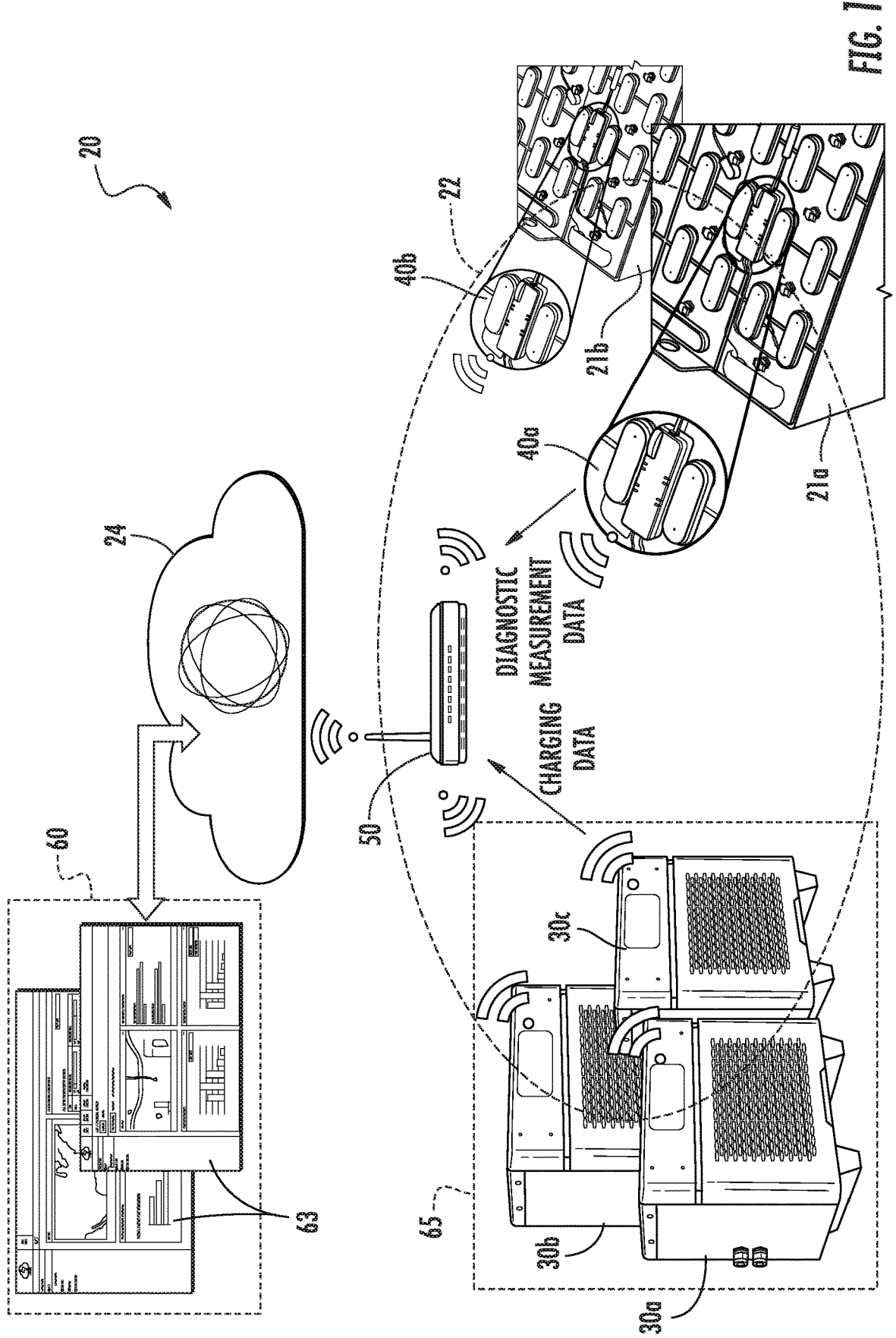
FIG. 1 is a schematic diagram of a battery management system in accordance with an embodiment.
Figure 2:
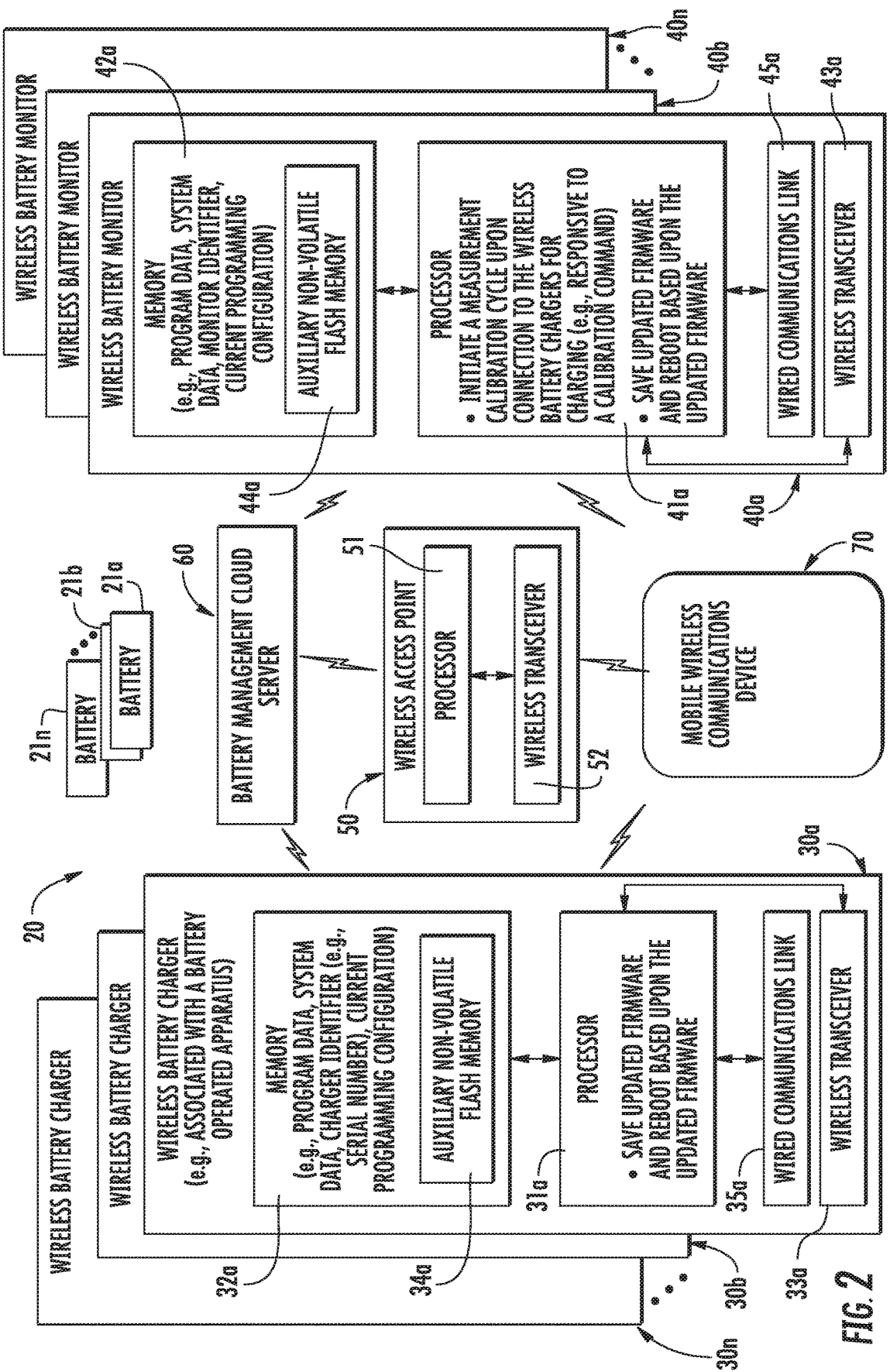
FIG. 2 is another schematic block diagram of a battery management system in accordance with an embodiment.
Figure 3:
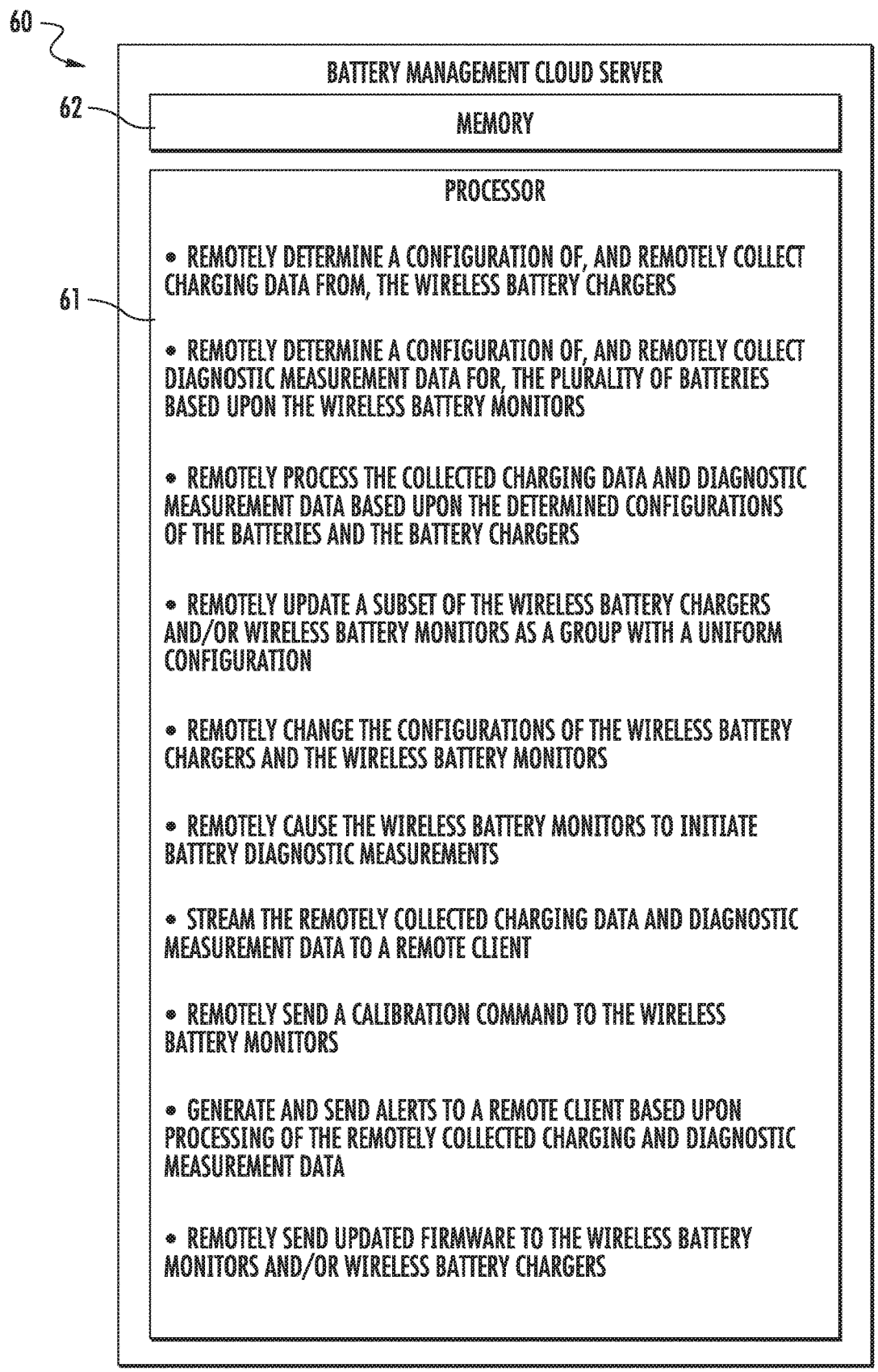
FIG. 3 is a schematic diagram of the battery management cloud server of FIG. 2.

Referring now to FIGS. 1-3, a battery management system 20 is for a plurality of batteries 21a-21n at a geographical location 22. The battery management system 20 includes wireless battery chargers 30a-30n at the geographical location 22. The wireless battery chargers 30a-30n are for charging the batteries 21a-21n, and each of the wireless battery chargers is remotely configurable and has a current charger programming configuration and a charger identifier associated therewith.

Each wireless battery charger 30a-30n may include a charger processor 31a (e.g., a microprocessor and a memory 32a coupled to the processor for storing program and system data. Each wireless battery charger 30a-30n also includes a wireless transceiver 33a. The wireless transceiver 33a may cooperate with the charger processor 31a to wirelessly communicate using one or more communications protocols, for example, WiFi, short-range (e.g., NFC, Bluetooth), cellular, etc.

The memory 32a may include auxiliary non-volatile flash memory 34a that may permit online updating of firmware. For example, upon receiving a new firmware program or update, the battery charger 30a-30n saves the new firmware into the non-volatile flash memory 34a, and the processor 31a then reboots, automatically, once the new firmware is verified. The battery chargers 30a-30n may also include a wired communication link 35a coupled to the processor 31a, such as, for example, an RS-485 or power line communications link.

The battery management system 20 also may include wireless battery monitors 40a-40n at the geographical location 22. The wireless battery monitors 40a-40n are for monitoring the batteries 21a-21n, for example, charging, performance, etc., and each of the wireless battery monitors is remotely configurable and has a current monitor programming configuration and a monitor identifier associated therewith.

Each wireless battery monitor 40a-40n may include a monitor processor 41a (e.g., a microprocessor and a memory 42a coupled to the processor for storing program and system data. Each wireless battery monitor 40a-40n also includes a wireless transceiver 43a. The wireless transceiver 43a may cooperate with the monitor processor 41a to wirelessly communicate using one or more communications protocols, for example, WiFi, short-range (e.g., NFC, Bluetooth), cellular, etc. Each wireless battery monitor 40a-40n may communicate, via the corresponding wireless transceiver 43a-43n, directly with the battery chargers 30a-30n during a charge cycle and exchange battery and charger parameters and settings, for example.

The memory 42a may include auxiliary non-volatile flash memory 44a that may permit online updating of firmware. For example, upon receiving a new firmware program or update, the battery monitor 40a-40n saves the new firmware into the non-volatile flash memory 44a, and the processor 41 then reboots, automatically, once the new firmware is verified. The battery monitors 40a-40n may also include a wired communication link 45a coupled to the processor 41a, such as, for example, an RS-485 or power line communications link.

The battery management system 20 may also include a wireless access point 50 at the geographical location 22 for communicating with the wireless battery chargers 30a-30n, the wireless battery monitors 40a-40n, and a battery management cloud server 60 in the cloud. The wireless access point 50 may be in the form of a wireless router and/or wireless gateway, for example.

The battery management cloud server 60 communicates with the wireless battery chargers 30a-30n and the wireless battery monitors 40a-40n by way of a network 24, for example, the internet and through the wireless access point 50. The battery management cloud server 60 includes a processor 61 and a memory 62 cooperating therewith. The battery management cloud server 60 may execute a battery monitor cloud application 63 (Cloud App) based upon a cloud computing platform, such as Amazon Web Services (AWS). The battery monitor cloud application 63 may cause the wireless access point 50 to facilitate or perform the functions or operations described herein. A software application may execute on a mobile wireless communications device 70, such as, for example, a smartphone, tablet, mobile device, or stationary device and communicate with the battery management cloud server 60. The cloud computing platform may include a collection of data and resources (e.g., hardware, data and/or software) provided and maintained by an off-site or off-premise party (e.g., third party), wherein the collection of data and resources can be accessed by an identified user via a network.

Referring again to the wireless access point 50, the wireless access point may include a processor 51 and an access point wireless transceiver 52 cooperating with the processor to communicate with the local (i.e., at the geographical location 22) wireless battery chargers 30a-30n and wireless battery monitors 40a-40n. A backhaul transceiver may also be provided to communicate with the battery monitor cloud application 63. By way of example, the local wireless network (i.e., at the geographical location 22) may be Wi-Fi, ZigBee, or sub GHz ISM band. Also by way of example, the backhaul may be via Ethernet, Wi-Fi, cell, or other wired or wireless connection to the internet. The wireless access point 50, by way of the processor 51, may further establish a local area network (LAN) at the geographical location 22 with a dedicated network ID and passcode, where the network ID and passcode are stored in the wireless battery chargers 30a-30n and wireless battery monitors 40a-40n at the geographical location, thus allowing only those wireless battery chargers and wireless monitors to connect to the local area network.

Configuration of the wireless battery chargers 30a-30n may be performed wirelessly by way of the battery management cloud server 60. More particularly, the configuration may be performed, in some embodiments, using the cloud application 63. For example, upon installation of a given wireless battery charger 30a-30n, the corresponding charger ID, serial number, the various battery charging parameters, the preferred charge algorithm, and the various charger options may also be entered and saved into the charger memory 32a using the mobile wireless communications device 70, for example, wirelessly connected to the LAN and the cloud application 63. By way of the cloud application 63, the wireless charger programmed values may be synchronized to the cloud or the battery management cloud server 60, and may be tagged with the charger serial number and ID. Additional parameters, such as, for example, the geographical location where the wireless battery charger 30a-30n is installed, installation date, customer and dealer contact info, along with other data can be saved to the cloud or battery management cloud server 60 rather than locally into the wireless battery charger and tagged with the charger serial number and ID.

Configuration of the wireless battery monitors 40a-40n may be performed wirelessly using the software application. For example, upon installation of a given wireless battery monitor 40a-40n, the battery monitor ID, the battery monitor serial number, the battery ID, the battery serial number, the model number, and various battery parameters, such as nominal voltage, amp-hours, manufacturing date, etc. may also be entered and saved into the monitor memory 42a using the mobile wireless communications device 70, for example, wirelessly connected to the LAN and the cloud application 63. By way of the cloud application 63, the wireless monitor programmed values may be synchronized to the cloud or the battery management cloud server 60, and may be tagged with the monitor serial number and ID. Additional parameters, such as, for example, the geographical location 22 where the wireless battery monitor 40a-40n is installed, installation date, customer and dealer contact info, along with other data can be saved to the cloud or battery management cloud server rather than locally into the wireless battery monitor and tagged with the charger serial number and ID.

The battery management cloud server 60, for example, by way of the cloud application 63, may also tag all battery charger and battery monitor configuration and data records with their respective device ID and or device serial number. The battery management cloud server 60, for example, by way of the cloud application 63, may also configure or change the configuration of the wireless battery chargers 30a-30n and/or the wireless battery monitors 40a-40n remotely. In addition, the cloud application 63 may download, for example, regularly or at desired intervals, the stored charger records from the wireless battery chargers 30a-30n and the stored cycle records from the wireless battery monitors 40a-40n remotely. Moreover, all battery data and analytics may be performed in the cloud at the battery management cloud server 60. In some embodiments, some of the battery data and analytics may be performed at the battery management cloud server 60.

The cloud application 63 may initiate remote communication with some or all wireless battery chargers 30a-30n and wireless battery monitors 40a-40n within or at a particular geographical location 22 or site. Upon receiving a request from the cloud application 63 or the battery management cloud server 60, the respective wireless battery chargers 30a-30n and battery monitors 40a-40n respond to the request. The request may include changing one or more configuration parameters, requesting data records, and/or performing diagnostic functions.

The battery management cloud server 60 through the cloud application 63 may also include or provide programming, configuration, grouping, and aggregation of the wireless battery chargers 30a-30n and wireless battery monitors 40a-40n installed at the various sites or geographical locations. In one example embodiment, the battery management cloud server 60 by way of the cloud application 63 includes a grouping function where certain wireless battery chargers 30a-30n within a geographical location 22 or site (e.g., pallet trucks chargers) and certain wireless battery monitors 40a-40n within a site or geographical location (e.g., reach truck batteries) can be grouped together so that they can be mass programmed. Mass programming allows users to configure and program groups of wireless battery chargers 30a-30n and/or wireless battery monitors 40a-40n with the same configuration and programming parameters, thus ensuring uniformity within the group.

More particularly, the battery management cloud server 60 groups a subset 65 of the wireless battery monitors 40a-40n based upon respective ones of the charger identifiers (e.g., monitor ID, serial number, etc.). The battery management cloud server 60 may, in some embodiments, initiate communications with each wireless battery charger 30a-30n of the grouped subset 65 to determine the respective current charger programming configurations. The battery management cloud server 60 generates a request to remotely update the current respective charger programming configurations of each wireless battery charger 30a-30n of the grouped subset 65 with a uniform updated programming configuration, for example, based upon the current programming configurations. For example, if, based upon the determined current charger programming configurations, certain ones of the subset 65 of wireless battery chargers 30a-30n do not need an updated configuration, those wireless battery chargers may not be updated with the uniform updated programming. The uniform updated programming may be performed as a broadcast. In other words, the battery management cloud server 60 may broadcast the uniform updated programming to all wireless battery chargers 30a-30n within the subset 65. The uniform updated programming configuration may include one or more of an updated charging algorithm, updated charger firmware, and updated battery charging parameters. Of course, the uniform updated programmed parameters may include other and/or additional parameters, as will be appreciated by those skilled in the art.

As will be appreciated by those skilled in the art, by mass programming of the wireless battery chargers 30a-30n within the subset 65, uniformity in programming is maintained within the group or subset. For example, in an example embodiment, each wireless battery charger 30a-30n is associated with a battery operated apparatus (e.g., a reach truck, a pallet truck, etc.) that performs a function at the geographical location 22 (e.g., shipping, receiving, etc.). The battery management cloud server 60 may thus group the subset 65 of the wireless battery chargers 30a-30n based upon like functions. That is, the subset may be grouped to include wireless battery chargers 30a-30n that perform shipping and receiving functions. Of course, the wireless battery chargers 30a-30n may be grouped into the subset 65 based upon more than one function, and/or any parameter (e.g. age, charger identifier, etc.)

Figure 4:
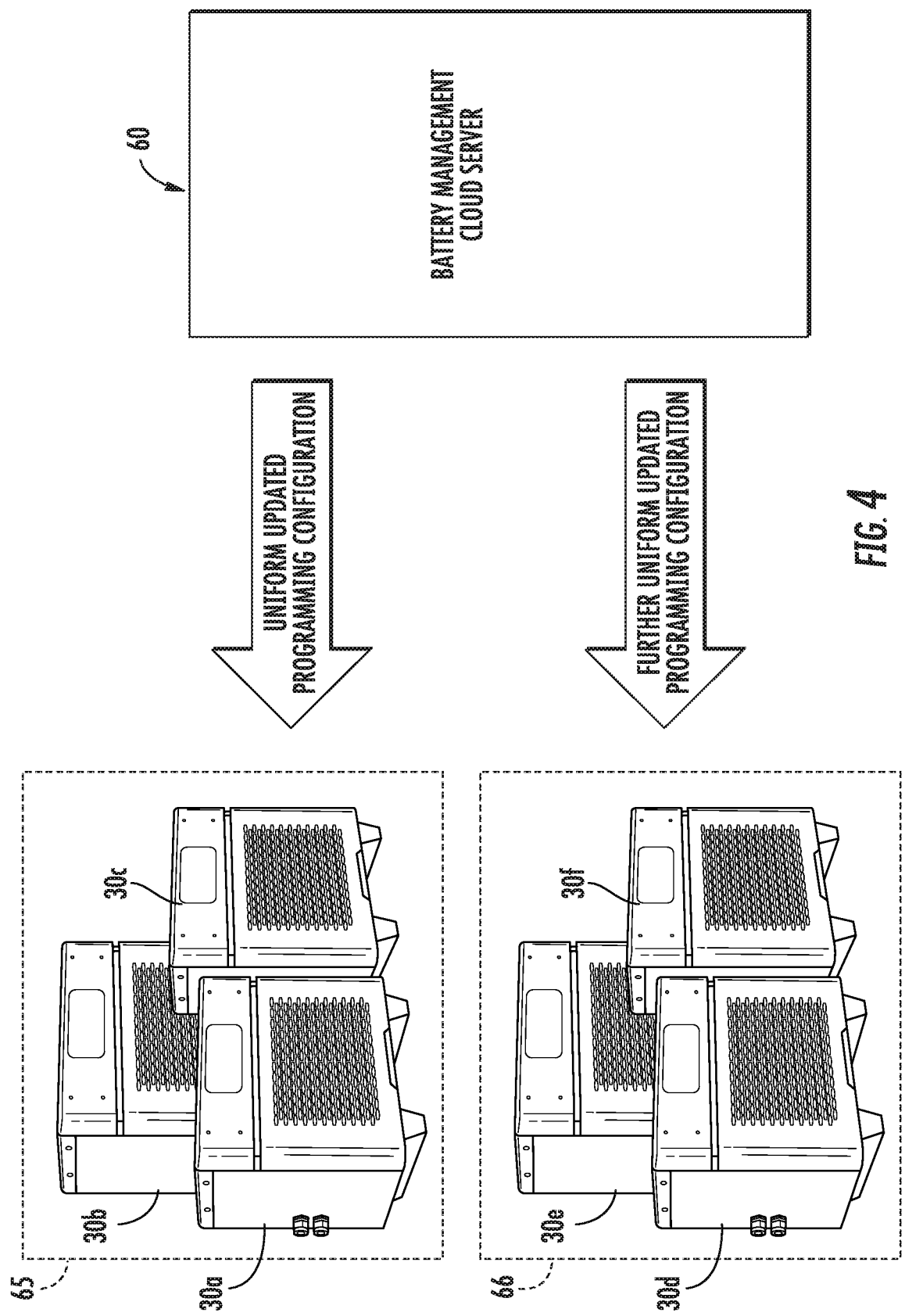
FIG. 4 is a schematic diagram of a portion of the battery management system in accordance with an embodiment.

Referring now additionally to FIG. 4, in some embodiments, the battery management cloud server 60 may group a further subset 66 of different ones of the wireless battery chargers 30a-30n based upon respective ones of the charger identifiers, and generate a further request to remotely update the current respective charger programming configurations of each wireless battery charger of the grouped further subset with a different uniform updated programming configuration. In other words, the battery management cloud server 60 may generate multiple updated uniform updated programming configurations for corresponding subsets of wireless battery chargers 30a-30n. It should be understood that the further subset or subsets may include at least one different wireless battery charger among each of the subsets.

Figure 5:
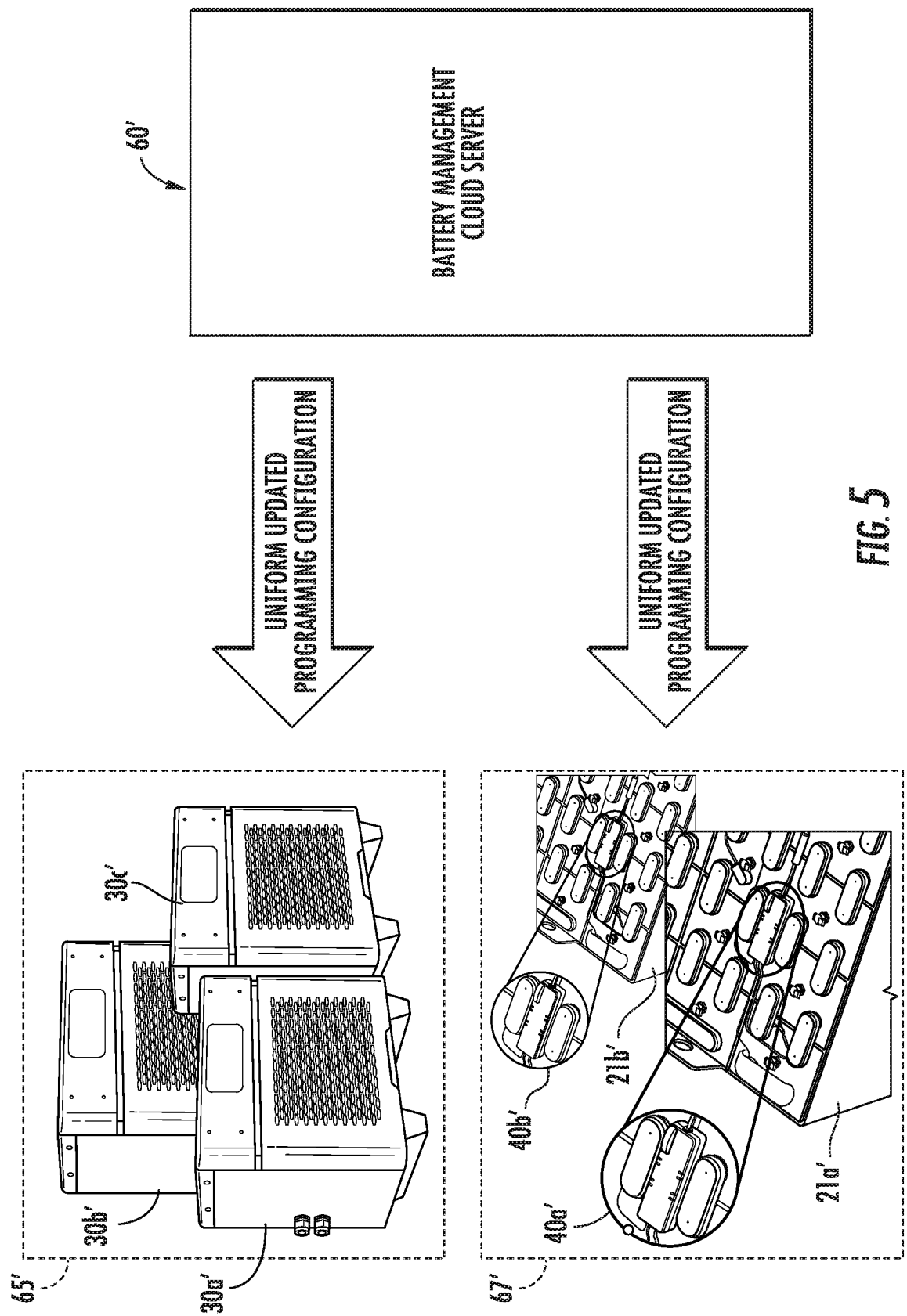
FIG. 5 is a schematic diagram of a portion of a battery management system in accordance with another embodiment.

Referring now briefly to FIG. 5, in another embodiment the battery management cloud server 60' may also group a subset 67' of wireless battery monitors 40a'-40n' based upon respective ones of the monitor identifiers. The battery management cloud server 60' may thus also remotely update the current respective monitor programming configurations of each wireless battery monitor 40a'-40n' of the grouped subset with the uniform updated programming configuration. In other words, the battery management cloud server 60' may form a subset 65' of wireless battery chargers 30a'-30n' and a subset 67' of wireless battery monitors 40a'-40n' or a single subset of both wireless battery chargers and monitors, and generate a request to remotely update the current respective charger and monitor configurations of each charger and monitor in the subset or subsets with the same uniform updated programming configuration.

Referring again to FIGS. 1-3, the battery management cloud server 60 or cloud application 63 may further include remote firmware program updates of wireless battery charger and/or wireless battery monitor firmware programs. As an example embodiment, the cloud application 63 or battery management cloud server 60 may send a firmware program file to one or more of the wireless battery chargers 30a-30n and/or wireless battery monitors 40a-40n at a given geographical location 22. Upon receiving a new firmware program, the processors 31a, 41a of the wireless battery chargers 30a-30n and wireless battery monitors 40a-40n will first save the new firmware into the non-volatile flash memory 34a, 44a and then reboots automatically once the new firmware is verified.

The battery management cloud server 60 or cloud application 63 may further include diagnostics functions that identify and troubleshoot battery and charger problems. For example, the cloud application 63 may save operational snapshots (e.g., screen/displays, operational data) of the wireless battery chargers 30a-30n throughout charge cycles, which can be retrieved later to troubleshoot charger issues. In another example embodiment, the cloud application 63 may project the wireless battery charger data or screens, or the wireless battery monitor real time data for real time streaming therethrough, thus allowing end users to monitor the charger and monitor operation live, for example, in-real time.

The battery management cloud server 60 or cloud application 63 may further perform or include calibration functions. For example, the battery management cloud server 60, via the cloud application 63, may send a remote command to a wireless battery monitor 40a-40n to calibrate its current measurement the next time it is connected to a wireless battery charger 30a-30n. Once the respective wireless battery monitor 40a-40n receives the calibration request, it initiates a calibration routine the next time it is connected to the wireless battery charger 30a-30n by requesting current readings from the wireless battery charger and comparing those readings with corresponding internal current measurements. The requested calibration function may then be performed.

The battery management cloud server 60 or cloud application 63 may also aggregate wireless battery charger and battery data per site (e.g., geographical location), per customer having multiple sites, per service dealer servicing multiple customers and multiple sites, for example. All data analytics and alerts may be performed by way of the battery management cloud server 60, for example. That is, no data processing need be performed locally. Email alerts may be sent by the battery management cloud server 60 or cloud application 63 to registered users. Of course, the battery management cloud server 60 may generate and communicate other and/or additional types of notifications, for example, display notifications on a display of the mobile wireless communications device, a short-message-service (SMS) message, instant message, and/or other type of alert or notification.

Figure 6:
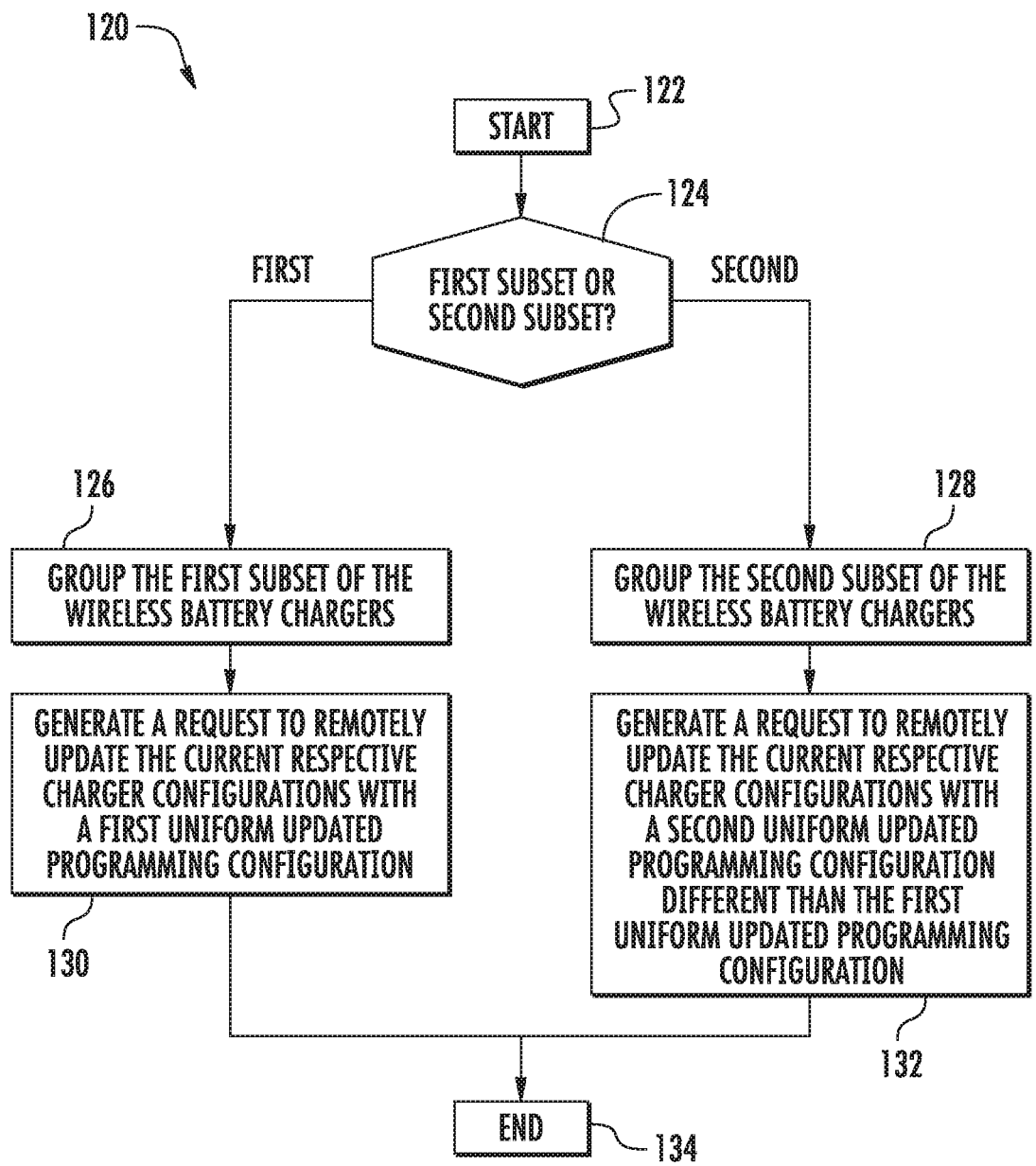
FIG. 6 is a flow diagram of a method of operation of a battery management system in accordance with an embodiment.

Referring now to the flowchart 120 in FIG. 6, beginning at Block 122, exemplary operations of the battery management cloud server 60 will now be described with respect to the wireless battery chargers 30a-30n and the wireless battery monitors 40a-40n. At Block 126, the battery management cloud server 60 groups a first subset 65 of the wireless battery chargers 30a-30n based upon respective ones of the charger identifiers. The battery management cloud server 60 groups a second subset 66 of the wireless battery chargers 30a-30n (Block 128). In particular, at Block 124, the battery management cloud server 60 determines whether a given wireless battery charger 30a-30n is part of the first subset 65 or second subset 66 based upon the respective charger identifier. If a given wireless battery charger 30a-30n is determined to be part of the first subset 65, it is grouped therewith (Block 126). If a given wireless battery charger 30a-30n is determined to be part of the second subset 66, it is grouped therewith (Block 128). The battery management cloud server 60, at Blocks 130, 132, respectively generates corresponding requests to remotely update the current respective charger programming configurations of each wireless battery charger 30a-30n of the first and second subsets 65, 66 with respective different uniform updated programming configurations. The method ends at Block 134.

Another method aspect is directed to a battery management method. The method may include using a battery management cloud server 60 for communicating with wireless battery chargers 30a-30n at a geographical location 22 for charging batteries 21a-21n and wireless battery monitors 40a-40n at the geographical location associated with the batteries to remotely determine a configuration of, and remotely collect charging data from, the wireless battery chargers. The method may further include using the battery management cloud server 60 to remotely determine a configuration of, and remotely collect diagnostic measurement data for, the batteries 21a-21n based upon the wireless battery monitors 40a-40n, and remotely process the collected charging data and diagnostic measurement data based upon the determined configurations of the batteries and the battery chargers 30a-30n.

A computer readable medium aspect is directed to a non-transitory computer readable medium that for a battery management cloud server 60 of a battery management system 20 for batteries 21a-21n at a geographical location 22 and that includes wireless battery chargers 30a-30n at a geographical location for charging the batteries and wireless battery monitors 40a-40n at the geographical location associated with the batteries. The non-transitory computer readable medium includes computer executable instructions that when executed by a processor 61 of the battery management cloud server 60 cause the processor to perform operations that may include remotely determining a configuration of, and remotely collect charging data from, the wireless battery chargers 30a-30n and remotely determining a configuration of, and remotely collect diagnostic measurement data for, the batteries 21a-21n based upon the wireless battery monitors 40a-40n. The operations may also include remotely processing the collected charging data and diagnostic measurement data based upon the determined configurations of the batteries 21a-21n and the battery chargers 30a-30n.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A battery management system for a plurality of batteries at a geographical location, the battery management system comprising:
   a plurality of wireless battery chargers at the geographical location for charging the plurality of batteries;
   a plurality of wireless battery monitors at the geographical location associated with the plurality of batteries; and
   a battery management cloud server for communicating with the wireless battery chargers and the wireless battery monitors to
      remotely determine a configuration of, and remotely collect charging data from, the wireless battery chargers,
      remotely determine a configuration of, and remotely collect diagnostic measurement data for, the plurality of batteries based upon the wireless battery monitors,
      remotely process the collected charging data and diagnostic measurement data based upon the determined configurations of the batteries and the battery chargers, and
      remotely change the configurations of the wireless battery chargers and the wireless battery monitors.

2. The battery management system of claim 1 wherein the battery management cloud server is further configured to remotely update a subset of the wireless battery chargers as a group with a uniform configuration.

3. The battery management system of claim 1 wherein the battery management cloud server is further configured to remotely update a subset of the wireless battery monitors as a group with a uniform configuration.

4. The battery management system of claim 1 wherein the battery management cloud server is further configured to remotely cause the wireless battery monitors to initiate battery diagnostic measurements.

5. The battery management system of claim 1 wherein the battery management cloud server is further configured to stream the remotely collected charging data and diagnostic measurement data to a remote client.

6. The battery management system of claim 1 wherein the wireless battery monitors are configured to initiate a measurement calibration cycle upon connection of the batteries to the wireless battery chargers for charging.

7. The battery management system of claim 6 wherein the battery management cloud server is further configured to remotely send a calibration command to the wireless battery monitors, and wherein the wireless battery monitors are configured to initiate the measurement calibration cycle responsive to the calibration command.

8. The battery management system of claim 1 wherein the battery management cloud server is further configured to generate and send alerts to a remote client based upon processing of the remotely collected charging and diagnostic measurement data.

9. The battery management system of claim 1 wherein the battery management cloud server is further configured to remotely send updated firmware to the plurality of wireless battery monitors, and wherein the plurality of wireless battery monitors is configured to save the updated firmware and reboot based upon the updated firmware.

10. The battery management system of claim 1 wherein the battery management cloud server is further configured to remotely send an updated firmware to the plurality of wireless battery chargers, and wherein the plurality of wireless battery chargers is configured to save the updated firmware and reboot based upon the updated firmware.

11. A battery management method comprising:
using a battery management cloud server for communicating with a plurality of the wireless battery chargers at a geographical location for charging a plurality of batteries and a plurality of wireless battery monitors at the geographical location associated with the plurality of batteries to
remotely determine a configuration of, and remotely collect charging data from, the wireless battery chargers,
remotely determine a configuration of, and remotely collect diagnostic measurement data for, the plurality of batteries based upon the wireless battery monitors,
remotely process the collected charging data and diagnostic measurement data based upon the determined configurations of the batteries and the battery chargers, and
remotely change the configurations of the wireless battery chargers and the wireless battery monitors.

12. The method of claim 11 wherein using the battery management cloud server comprises using the battery management cloud server to remotely update a subset of the wireless battery chargers as a group with a uniform configuration.

13. The method of claim 11 wherein using the battery management cloud server comprises using the battery management cloud server to remotely update a subset of the wireless battery monitors as a group with a uniform configuration.

14. The method of claim 11 wherein using the battery management cloud server comprises using the battery management cloud server to remotely cause the wireless battery monitors to initiate battery diagnostic measurements.

15. The method of claim 11 wherein using the battery management cloud server comprises using the battery management cloud server to stream the remotely collected charging data and diagnostic measurement data to a remote client.

16. A non-transitory computer readable medium for a battery management cloud server of a battery management system for a plurality of batteries at a geographical location and comprising a plurality of wireless battery chargers at a geographical location for charging the plurality of batteries and a plurality of wireless battery monitors at the geographical location associated with the plurality of batteries, the non-transitory computer readable medium comprising computer executable instructions stored thereon that when executed by a processor of the battery management cloud server cause the processor to perform operations comprising:
remotely determining a configuration of, and remotely collect charging data from, the wireless battery chargers;
remotely determining a configuration of, and remotely collect diagnostic measurement data for, the plurality of batteries based upon the wireless battery monitors;
remotely processing the collected charging data and diagnostic measurement data based upon the determined configurations of the batteries and the battery chargers; and
remotely changing the configurations of the wireless battery chargers and the wireless battery monitors.

17. The non-transitory computer readable medium of claim 16 wherein the operations comprise remotely updating a subset of the wireless battery chargers as a group with a uniform configuration.

18. The non-transitory computer readable medium of claim 16 wherein the operations comprise remotely updating a subset of the wireless battery monitors as a group with a uniform configuration.

19. The non-transitory computer readable medium of claim 16 wherein the operations comprise remotely causing the wireless battery monitors to initiate battery diagnostic measurements.

20. The non-transitory computer readable medium of claim 16 wherein the operations comprise streaming the remotely collected charging data and diagnostic measurement data to a remote client.

* * * * *